(12) United States Patent
Kim et al.

(10) Patent No.: US 11,474,205 B2
(45) Date of Patent: Oct. 18, 2022

(54) ELECTRONIC DEVICE FOR IMPROVING PERFORMANCE OF SENSOR

(71) Applicant: Samsung Electronics Co., Ltd., Gyeonggi-do (KR)

(72) Inventors: Il Kim, Gyeonggi-do (KR); Hyeongsoon Park, Gyeonggi-do (KR); Jeonggyu Jo, Gyeonggi-do (KR); Dareum Kang, Gyeonggi-do (KR); Chohee Park, Gyeonggi-do (KR); Seongwoo Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 305 days.

(21) Appl. No.: 16/848,062

(22) Filed: Apr. 14, 2020

(65) Prior Publication Data
US 2020/0326412 A1    Oct. 15, 2020

(30) Foreign Application Priority Data
Apr. 15, 2019   (KR) .......................... 10-2019-0043790

(51) Int. Cl.
*G01S 7/481*     (2006.01)
*G02B 5/30*      (2006.01)

(52) U.S. Cl.
CPC .......... *G01S 7/4811* (2013.01); *G02B 5/3025* (2013.01); *G02B 5/3083* (2013.01)

(58) Field of Classification Search
CPC ................................................... G02B 5/3025
See application file for complete search history.

(56) References Cited

U.S. PATENT DOCUMENTS

| | | | |
|---|---|---|---|
| 10,705,272 B2 | 7/2020 | Smith et al. | |
| 2013/0120760 A1* | 5/2013 | Raguin | G01B 11/24 |
| | | | 356/612 |
| 2014/0353477 A1* | 12/2014 | Johnson | G01D 5/34792 |
| | | | 250/231.1 |
| 2016/0224816 A1* | 8/2016 | Smith | G02B 5/201 |
| 2018/0046281 A1 | 2/2018 | Pi et al. | |
| 2018/0173343 A1 | 6/2018 | Pi et al. | |
| 2018/0259388 A1 | 9/2018 | Oh et al. | |
| 2018/0337219 A1 | 11/2018 | Rhee et al. | |
| 2018/0357460 A1 | 12/2018 | Smith et al. | |
| 2018/0357462 A1* | 12/2018 | Mackey | H01L 27/3234 |
| 2019/0034690 A1 | 1/2019 | Jung et al. | |

FOREIGN PATENT DOCUMENTS

KR    10-2018-0102806    9/2018

OTHER PUBLICATIONS

International Search Report dated Jul. 31, 2020 issued in counterpart application No. PCT/KR2020/005038, 12 pages.

* cited by examiner

*Primary Examiner* — Sang V Nguyen
(74) *Attorney, Agent, or Firm* — The Farrell Law Firm, P.C.

(57) ABSTRACT

An electronic device is provided. An electronic device includes a sensor, a display including a first surface and a second surface, a rear linear polarizer disposed at a front surface of the sensor module, a rear phase difference film disposed between a front surface of the rear linear polarizer and the second surface of the display, a front phase difference film disposed at the first surface of the display at a position corresponding to a location of the sensor, a front linear polarizer disposed at a front surface of the front phase difference film, and a front plate disposed at a front surface of the front linear polarizer.

10 Claims, 10 Drawing Sheets

ELECTRONIC DEVICE FOR IMPROVING PERFORMANCE OF SENSOR

CROSS-REFERENCE TO RELATED APPLICATION(S)

This application is based on and claims priority under 35 U.S.C. § 119 to Korean Patent Application No. 10-2019-0043790, filed on Apr. 15, 2019, in the Korean Intellectual Property Office, the entire disclosure of which is incorporated herein by reference.

BACKGROUND

1. Field

The disclosure relates generally to improving performance of a sensor included in an electronic device.

2. Description of Related Art

An electronic device (e.g., a smartphone) may include various sensors. The electronic device may include a proximity sensor disposed in a front surface of its display. The electronic device may detect whether a user is close to the electronic device, using the proximity sensor.

As the demand for an electronic device having a large display has grown, the display is often provided over a majority of a front surface of the electronic device. For example, the entire front surface of an electronic device may be configured as the display.

When the size of the display is increased, a sensor disposed at a front surface of the display may be moved below display, e.g., on a lower layer of a screen display region. The sensor located on the screen display region of the display may transmit and receive light for sensing through the display. However, a lot of light output from the sensor is reflected from the display to interrupt a normal operation of the sensor.

SUMMARY

The disclosure is made to address at least the above-mentioned problems and/or disadvantages and to provide at least the advantages described below.

Accordingly, an aspect of the disclosure is to provide an electronic device for improving performance of a sensor disposed on a lower layer of a screen display region.

In accordance with an aspect of the disclosure, an electronic device is provided. The electronic device includes a sensor, a display including a first surface and a second surface, a rear linear polarizer disposed at a front surface of the sensor, a rear phase difference film disposed between a front surface of the rear linear polarizer and the second surface of the display, a front phase difference film disposed at the first surface of the display at position corresponding to a location of the sensor, a front linear polarizer disposed at a front surface of the front phase difference film, and a front plate disposed at a front surface of the front linear polarizer.

In accordance with another aspect of the disclosure, an electronic device is provided. The electronic device includes a sensor including an optical transmitter and an optical receiver, a display including a first surface and a second surface, a left linear polarizer disposed between a front surface of the optical transmitter of the sensor and the second surface of the display, a right linear polarizer disposed between a front surface of the optical receiver of the sensor module and the second surface of the display, a front phase difference film disposed at the first surface of the display a position corresponding to a location of the sensor, a front linear polarizer disposed at a front surface of the front phase difference film, and a front plate disposed at a front surface of the front linear polarizer.

In accordance with another aspect of the disclosure, an electronic device is provided. The electronic device includes a sensor, a display including a first surface and a second surface, and a collimator disposed between the sensor and the second surface of the display.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments. Therefore, those skilled in the art will recognize that various changes and modifications of the embodiments described herein can be made without departing from the scope and spirit of the disclosure. In addition, descriptions of well-known functions and constructions are omitted for clarity and conciseness.

Figure 1:
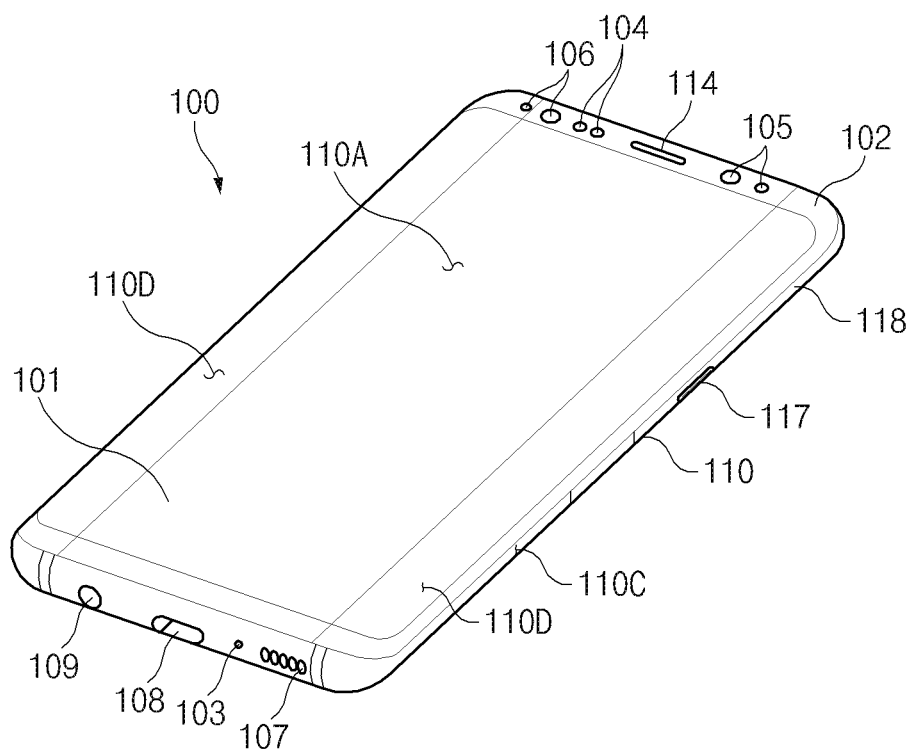
FIG. 1 illustrates a front surface of an electronic device according to an embodiment.
Figure 2:
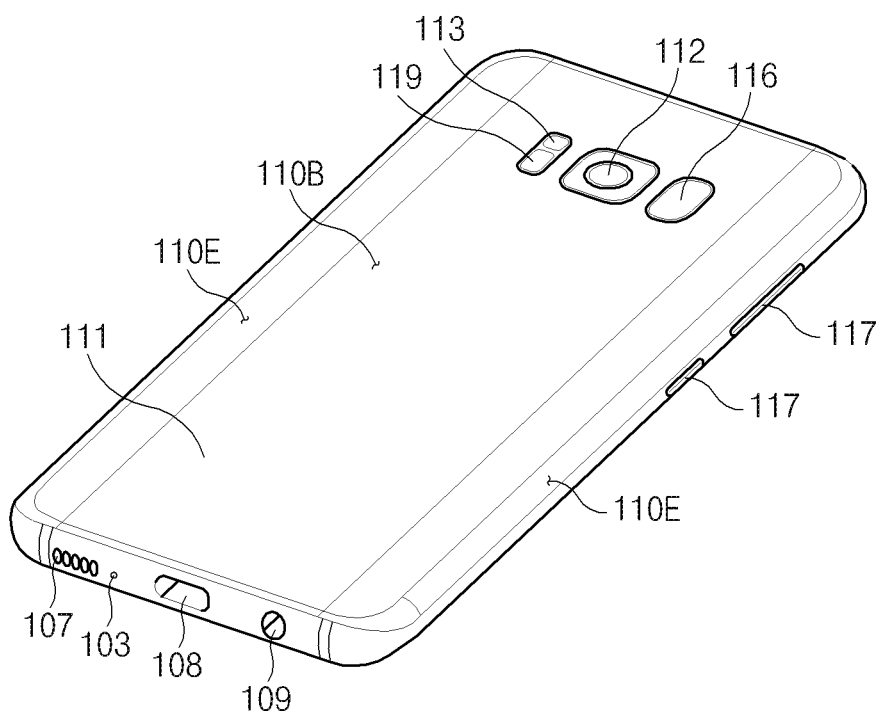
FIG. 2 illustrates a rear surface of the electronic device of FIG. 1.

FIG. 1 illustrates a front surface of an electronic device according to an embodiment. FIG. 2 illustrates a rear surface of the electronic device of FIG. 1.

Referring to FIGS. 1 and 2, an electronic device 100 includes a housing 110 including a first surface (or a front surface) 110A, a second surface (or a rear surface) 110B, and a side surface 110C surrounding a space between the first surface 110A and the second surface 110B. Alternatively, the housing 110 may be referred to as a structure that forms the first surface 110A of FIG. 1, the second surface 110B of FIG. 1, and some of the side surfaces 110C of FIG. 1. At least a portion of the first surface 110A may be formed by a substantially transparent front plate 102 (e.g., a glass plate including various coating layers or a polymer plate). The second surface 110B may be formed by a substantially opaque back plate 111. The back plate 111 may be formed of coated or colored glass, ceramics, polymer, metal (e.g., aluminum, stainless steel (STS), or magnesium), or combinations at least two of these materials. The side surface 110C may be combined with the front plate 102 and the back plate 111 and may be formed by a side bezel structure (or side member) 118 including metal and/or polymer. The back plate 111 and the side bezel structure 118 may be integrated with each other and may include the same material (e.g., a metal material such as aluminum).

The front plate 102 includes two first regions 110D, which are bent from the first surface 110A to the back plate 111 to be seamlessly extended, at both ends of a long edge of the front plate 102. As illustrated in FIG. 2, the back plate 111 includes two second regions 110E, which are bent from the second surface 110B to the front plate 102 to be seamlessly extended, at both ends of a long edge of the back plate 111. Alternatively, the front plate 102 (or the back plate 111) may include only one of the first regions 110D (or the second regions 110E), or some of the first regions 110D or the second regions 110E may be omitted.

When viewed from the side of the electronic device 100, the side bezel structure 118 may have a first thickness (or width) at a side where the first regions 110D or the second regions 110E are not included and may have a second thickness thinner than the first thickness at a side including the first regions 110D or the second regions 110E.

The electronic device 100 includes a display 101, audio modules 103, 107, and 114, sensor modules 104, 116, and 119, camera modules 105, 112, and 113, a key input device 117, a light emitting element 106, and connector holes 108 and 109. Alternatively, the electronic device 100 may omit at least one of the components (e.g., the key input device 117 or the light emitting element 106) or may additionally include another component.

The display 101 may be exposed through a sizeable portion of the front plate 102. At least a portion of the display 101 may be exposed through the front plate 102 forming the first surface 110A and the first regions 110D of the side surface 110C. An edge of the display 101 may be formed substantially the same as an adjacent outer shape of the front plate 102. To expand an area where the display 101 is exposed, intervals between the outside of the display 101 and the outside of the front plate 102 may be substantially the same as each other.

A recess or opening may be formed in a portion of a screen display region of the display 101, and the electronic device 100 may include at least one or more of the audio module 114, the sensor module 104, the camera module 105, and the light emitting element 106, which are aligned with the recess or the opening. The electronic device 100 includes the audio module 114, the sensor module 104, the camera module 105, the fingerprint sensor 116, and the light emitting element 106 in a rear surface of the screen display region of the display 101. Alternatively, the display 101 may be coupled to or disposed adjacent to a touch sensing circuitry, a pressure sensor capable of measuring intensity (e.g., the pressure) of a touch, and/or a digitizer capable of detecting a magnetic field type stylus pen. At least a portion of the sensor modules 104 and 119 and/or at least a portion of the key input devices 117 may be disposed in the first regions 110D and/or the second regions 110E.

The audio modules 103, 107, and 114 may include the microphone hole 103 and the speaker holes 107 and 114. A microphone for obtaining an external sound may be disposed in the microphone hole 103, or a plurality of microphones capable of detecting a direction of a sound may be arranged in the microphone hole 103. The speaker holes 107 and 114 may include the external speaker hole 107 and the receiver hole 114 for call. The speaker holes 107 and 114 and the microphone hole 103 may be implemented as one hole, or a speaker (e.g., a piezo speaker) may be included without the speaker holes 107 and 114.

The sensor modules 104, 116, and 119 may generate an electrical signal or a data value corresponding to an operation state of the electronic device 100 or an environment state outside the electronic device 100. The sensor modules 104, 116, and 119 may include the first sensor module 104 (e.g., a proximity sensor) and/or a second sensor module (e.g., a fingerprint sensor), disposed in the first surface 110A of the housing 110, and the third sensor module 119 (or a heart rate monitor (HRM) sensor) and/or the fourth sensor module 116 (e.g., a fingerprint sensor), disposed in the second surface 110B of the housing 110. The fingerprint sensor may be disposed in the second surface 110B as well as the first surface 110A. The electronic device 100 may further at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and the illumination sensor 104.

The camera modules 105, 112, and 113 may include the first camera device 105 disposed in the first surface 110A of the electronic device 100, the second camera device 112 disposed in the second surface 110B, and/or the flash 113. Each of the camera devices 105 and 112 may include one lens or a plurality of lenses, an image sensor, and/or an image signal processor (ISP). The flash 113 may include a light-emitting diode or a xenon lamp.

Two or more lenses (e.g., an infrared camera and wide-angle and telephoto lenses) and image sensors may be disposed in one surface of the electronic device 100.

The key input devices 117 may be disposed in the side surface 110C of the housing 110. Alternatively, the electronic device 100 may omit a portion or all of the above-mentioned key input devices 117, and the key input device 117 that is not included may be implemented in another form, such as a soft key, on the display 101. The key input device 117 may include the sensor module 116 disposed in the second surface 110B of the housing 110.

The light emitting element 106 is disposed in the first surface 110A of the housing 110 and may provide state information of the electronic device 100 in an optical form. Alternatively, the light emitting element 106 may provide a light source interacting with an operation of the camera module 105. The light emitting element 106 may include a light-emitting diode (LED), an IR LED, and a xenon lamp.

The connector holes 108 and 109 may include the first connector hole 108 capable of receiving a connector (e.g., a universal serial bus (USB) connector) for transmitting and receiving power and/or data with an external electronic device and/or the second connector hole (e.g., an earphone jack) capable of receiving a connector for transmitting and receiving an audio signal with the external electronic device.

Figure 3:
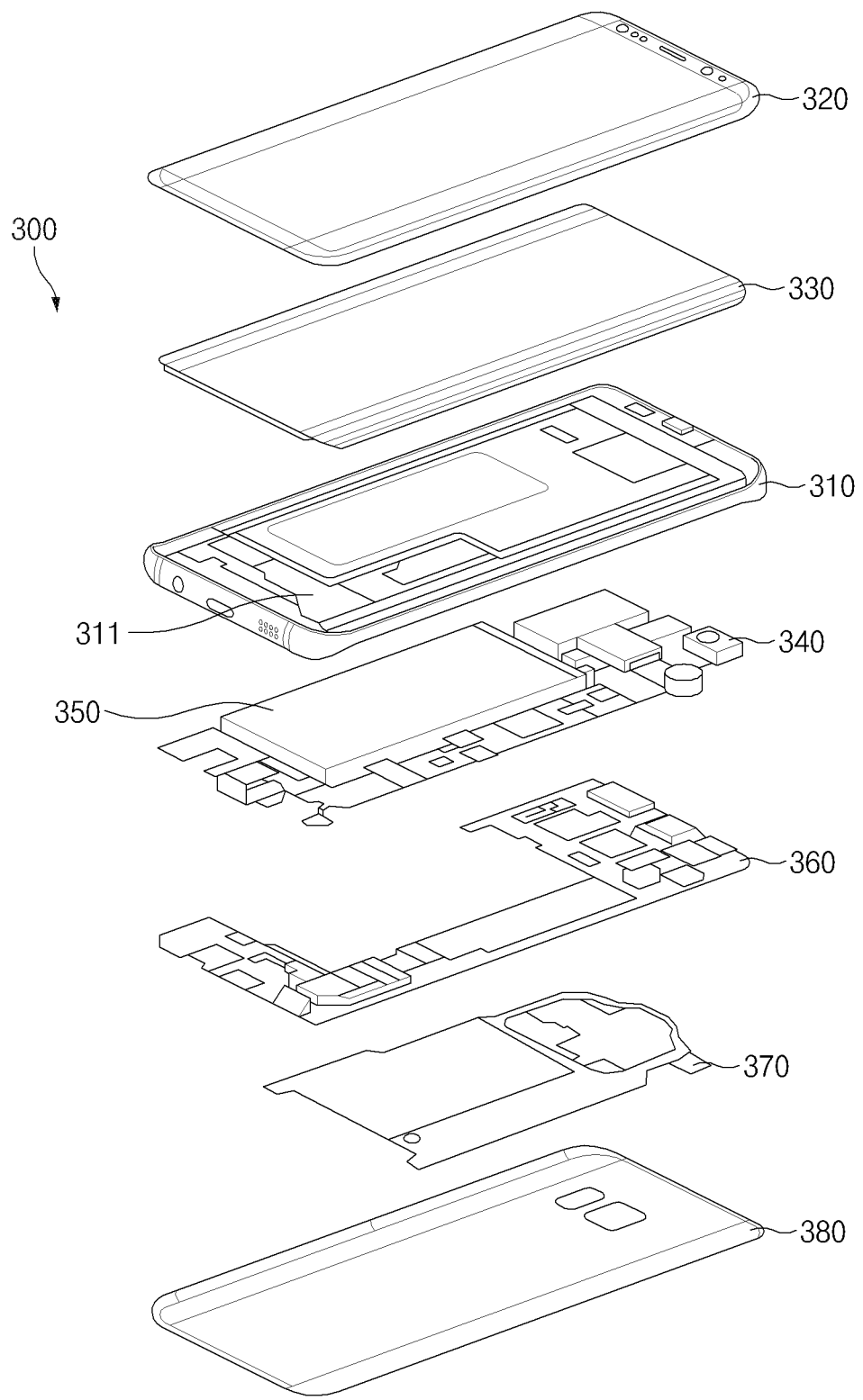
FIG. 3 illustrates an exploded perspective view of an electronic device according to an embodiment.

FIG. 3 illustrates an exploded perspective view of an electronic device according to an embodiment.

Referring to FIG. 3, an electronic device 300 includes a side bezel structure 310, a first supporting member 311 (e.g., a bracket), a front plate 320, a display 330, a printed circuit board (PCB) 340, a battery 350, a second supporting member 360, an antenna 370, and a back plate 380. Alternatively, the electronic device 300 may omit at least one of the components (e.g., the first supporting member 311 or the second supporting member 360) or may include an additional component.

The first supporting member 311 may be connected with the side bezel structure 310 or may be integrated with the side bezel structure 310. The first supporting member 311 may be formed of a metal material and/or a non-metal (e.g., polymer) material. The display 330 may be combined with one surface of the first supporting member 311, and the PCB 340 may be combined with the other surface. A processor, a memory, and/or an interface may be mounted on the PCB 340. The processor may include one or more of, for example, a central processing unit (CPU), an application processor (AP), a graphic processing unit (GPU), an ISP, a sensor hub processor, or a communication processor (CP).

The memory may include a volatile memory or a non-volatile memory.

The interface may include a high definition multimedia interface (HDMI), a USB interface, a secure digital (SD) card interface, and/or an audio interface. The interface may electrically or physically connect the electronic device 300 with an external electronic device and may include a USB connector, an SD card/MMC connector, and/or an audio connector.

The battery 350 may supply power to at least one component of the electronic device 300. The battery 350 may include a non-rechargeable primary battery, a rechargeable battery, and/or a fuel cell. At least a portion of the battery 350 may be disposed on substantially the same plane as PCB 340. The battery 350 may be disposed integrally in the electronic device or may be removable from the electronic device 300.

The antenna 370 is disposed between the back plate 380 and the second supporting member 360. The antenna 370 may include a near field communication (NFC) antenna, a wireless charging antenna, and/or a magnetic secure transmission (MST) antenna. The antenna 370 may perform short range communication with an external device or may wirelessly transmit and receive power for charging. Additionally or alternatively, an antenna structure may be formed by a portion of the side bezel structure 310 and/or the first supporting member 311 or a combination thereof.

Figure 4:
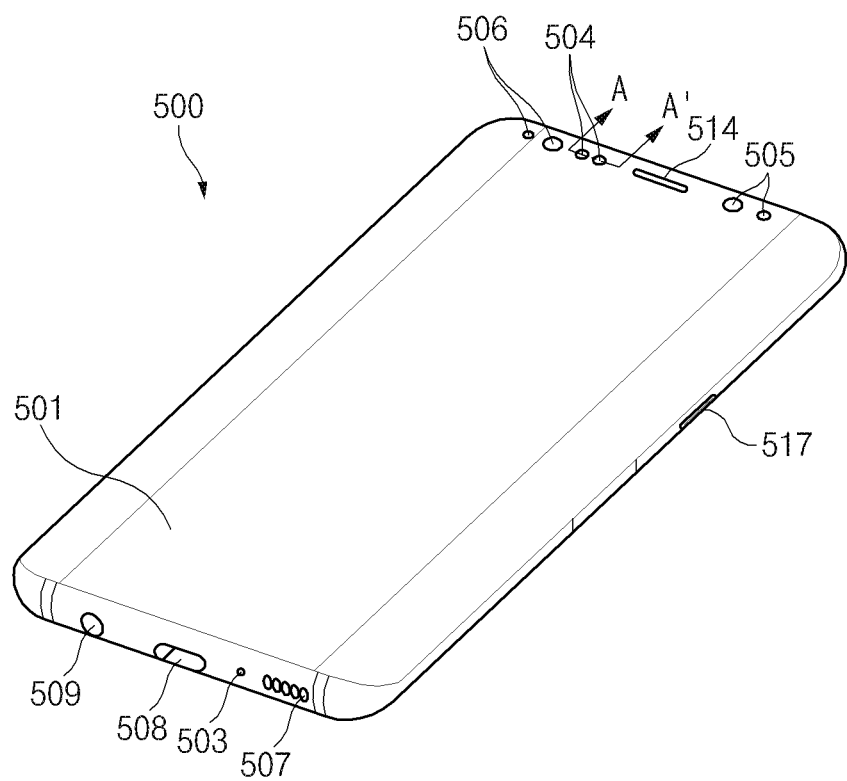
FIG. 4 illustrates a front surface of an electronic device according to an embodiment.

FIG. 4 illustrates a front surface of an electronic device according to an embodiment.

Referring to FIG. 4, an electronic device 500 includes a display 501, a sensor module 504, audio modules 503, 507, and 514, a camera module 505, a key input device 517, a light emitting element 506, and connector holes 508 and 509.

The sensor module 504 is disposed in a rear surface of a screen display region of the display 501. At least some signal lines (e.g., a data line and a gate line) associated with driving, e.g., the display 501 may be disposed in the screen display region.

The sensor module 504 (e.g., a proximity sensor or an illumination sensor) may include at least one of a transmit unit and a receive unit. The transmit unit may output at least a partial signal (or light) to a front surface of the sensor module 504 through the screen display region. The receive unit may receive at least a partial signal (or light) that is output from the transmit unit and is then reflected from a subject positioned in front of the sensor module 504.

Figure 5A:
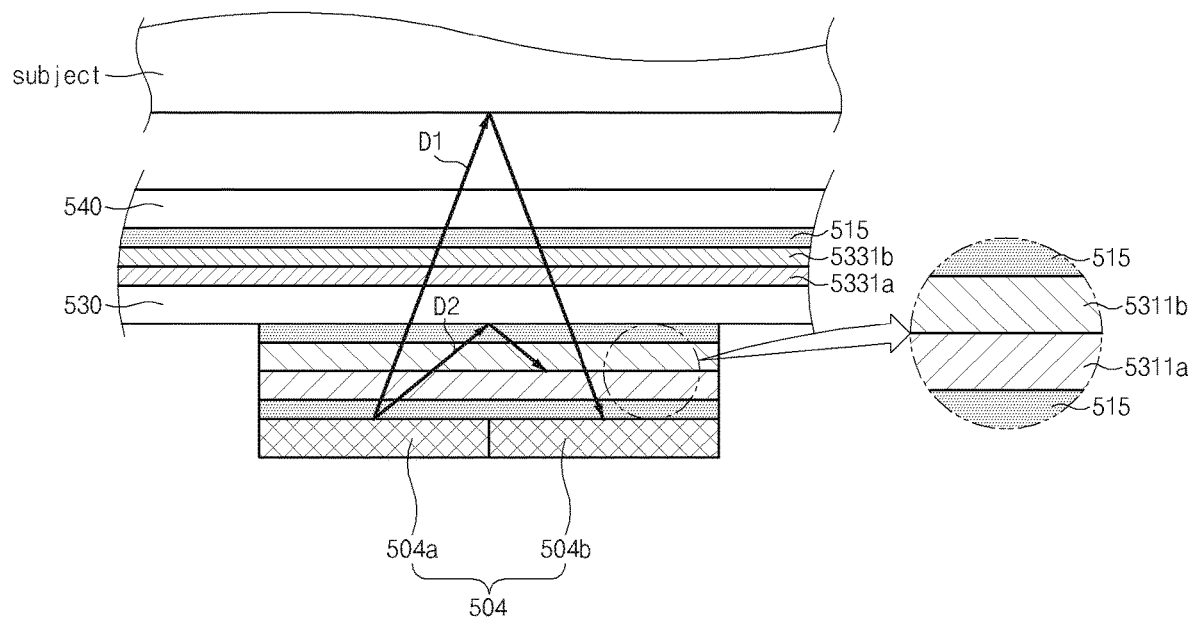
FIGS. 5A and 5B illustrate cross-sectional views taken along line A-A' of FIG. 4 according to an embodiment.
Figure 5B:
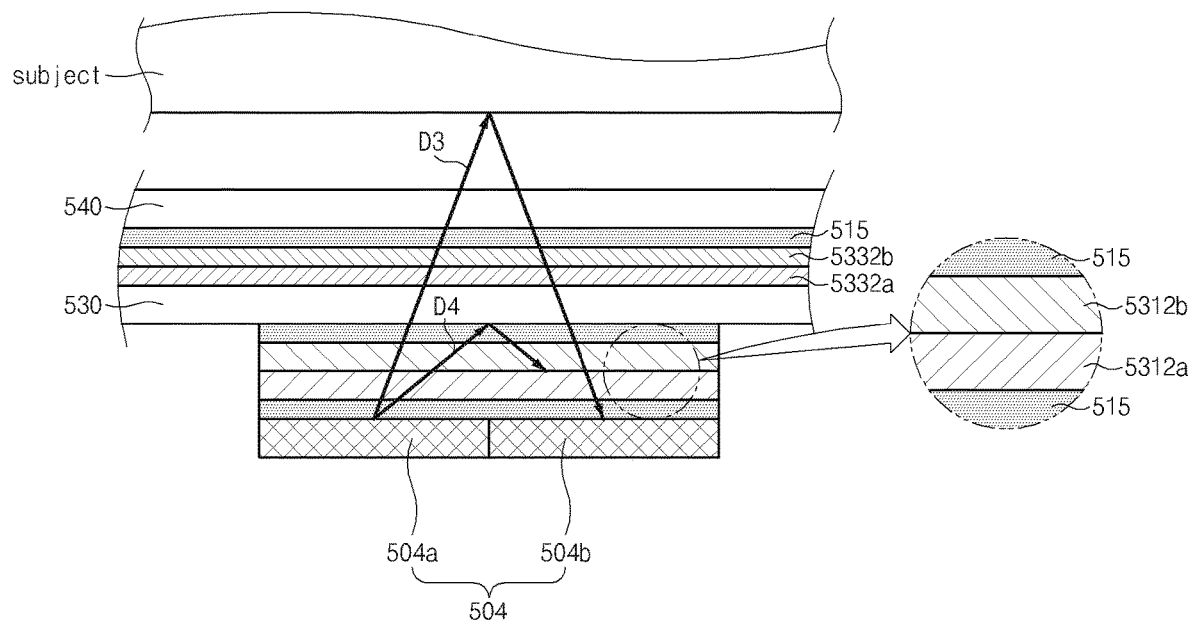

FIGS. 5A and 5B illustrate cross-sectional views taken along line A-A' of FIG. 4 according to an embodiment.

Referring to FIG. 5A, in the electronic device 500, a sensor module 504, a display 530, and a front plate 540 are arranged from a second surface (e.g., a rear surface) to a first surface (e.g., a front surface). The sensor module 504 includes, for example, an optical transmitter 504a and an optical receiver 504b. The optical transmitter 504a and the optical receiver 504b may be arranged at a rear surface of the display 530. The display 530 may be disposed at a rear surface of the front plate 540.

A first rear line polarizer 5311a and a first rear phase difference film 5311b may be laminated between a front surface of the sensor module 504 and a rear surface of the display 530. The first rear linear polarizer 5311a laminated on the front surface of the sensor module 504 may polarize a vibration direction of a passed signal (or light) in a first polarization direction (e.g., a direction parallel to an X-axis of a space coordinate system). A direction in which a phase difference of the first rear phase difference film 5311b laminated on a front surface of the first rear linear polarizer 5311a occurs may differ by an angle of 45 degrees from a vibration surface corresponding to the vibration direction of the passed signal. Further, the first rear phase difference film 5311b may generate a phase difference of about $\lambda/4$ in the passed signal.

A first front phase difference film 5331a and a first front linear polarizer 5331b may be laminated between a front surface of the display 530 and a rear surface of the front plate 540. A direction in which a phase difference of the first front phase difference film 5331a laminated on the front surface of the display 530 occurs may differ by an angle of 45 degrees from the vibration surface corresponding to the vibration direction of the passed signal. Further, the first front phase difference film 5331a may generate a phase difference of about $\lambda/4$ in the passed signal.

The first front linear polarizer 5331b laminated on a front surface of the first front phase difference film 5331a may polarize the vibration direction of the passed signal in a second polarization direction (e.g., a direction parallel to a Y-axis of the space coordinate system).

An adhesive member 515 (e.g., an optical clear adhesive (OCA)) is disposed between the sensor module 504 and the first rear linear polarizer 5311a, the first rear phase difference film 5311b and the display 530, and the first front linear polarizer 5331b and the front plate 540. The adhesive member 515 may have a refractive index of 1.4 to 1.6 with respect to a signal passing through at least one of the first rear linear polarizer 5311a, the first rear phase difference film 5311b, the first front phase difference film 5331a, and the first front linear polarizer 5331b.

A phase difference film (e.g., the first rear phase difference film 5311b or the first front phase difference film 5331a) may vary in $\lambda$ according to an infrared or visible region. For example, $\lambda$ of the first rear phase difference film 5311b in the infrared region may be designed to be close to an infrared region setting value of the sensor module 504. As another example, $\lambda$ of the first front phase difference film 5331a in the visible region may be designed to be close to the visible region, e.g., 450 nm to 600 nm. When $\lambda$ of the first rear phase difference film 5311b and $\lambda$ of the first front phase difference film 5331a differ from each other, a phase difference that occurs in the first rear phase difference film 5311b may be within a corrected range of $3\lambda/8$ to $5\lambda/8$ from $\lambda/4$. For example, close to $\lambda/4$, noise that occurs in the phase difference film may be minimized. Further, when correcting a value of $\lambda/4$ to a setting range (e.g., $3\lambda/8$ to $5\lambda/8$), loss of a signal passing through the phase difference film may be minimized.

For a signal proceeding along a first path D1, a signal output from the optical transmitter 504a may arrive at the optical receiver 504b through first to eighth stages. In the first stage, the signal output from the optical transmitter 504a may pass through the first rear linear polarizer 5311a to be polarized in the first polarization direction (e.g., the direction parallel to the X-axis of the space coordinate system). In the second stage, the signal of the first polarization direction, which passes through the first rear linear polarizer 5311a and then passes through the first rear phase difference film 5311b, may have a phase difference of approximately λ/4, which occurs in the direction of 45 degrees with respect to the first polarization direction and may rotate in a first rotation direction (e.g., a clockwise direction).

In the third stage, the signal of the first rotation direction, which transmits the display 530 and then passes through the first front phase difference film 5331a, may have a phase difference of approximately λ/4, which further occurs in the direction of 45 degrees with respect to the first polarization direction to be polarized in the second polarization direction. In the fourth stage, the signal of the second polarization direction, which passes through the first front phase difference film 5331a, may pass through the first front linear polarizer 5331b having a polarization characteristic of the second polarization direction without loss of signal. In the fifth stage, the signal (or light) of the second polarization direction, which passes through the first front linear polarizer 5331b and is then reflected from a subject positioned in front of the sensor module 504, may pass through the first front linear polarizer 5331b without loss of signal.

In the sixth stage, the signal of the second polarization direction, which passes through the first front linear polarizer 5331b and then passes through the first front phase difference film 5331a, may have a phase difference of approximately λ/4, which occurs in the direction of 45 degrees with respect to the second polarization direction, and may rotate in the first rotation direction. In the seventh stage, the signal of the first rotation direction, which transmits the display 530 and then passes through the first rear phase difference film 5311b, may have a phase difference of approximately λ/4, which further occurs in the direction of 45 degrees with respect to the second polarization direction to be polarized in the first polarization direction. In the eighth stage, the signal of the first polarization direction, which passes through the first rear phase difference film 5311b, may pass through the first rear linear polarizer 5311a, without loss of signal at the optical receiver 504b.

For a signal proceeding along a second path D2, a signal output from the optical transmitter 504a may be attenuated by the first rear linear polarizer 5311a through first to fourth stages. In the first stage, the signal (or light) output from the optical transmitter 504a may pass through the first rear linear polarizer 5311a to be polarized in the first polarization direction (e.g., the direction parallel to the X-axis of the space coordinate system). In the second stage, the signal (or light) of the first polarization direction, which passes through the first rear linear polarizer 5311a and then passes through the first rear phase difference film 5311b, may have a phase difference of approximately λ/4, which occurs in the direction of 45 degrees with respect to the first polarization direction, and may rotate in the first rotation direction (e.g., the clockwise direction). In the third stage, the signal of the first rotation direction, which passes through the first rear phase difference film 5311b and is then reflected from the display 530 to pass through the first rear phase difference film 5311b, may have a phase difference of approximately λ/4, which further occurs in the direction of 45 degrees with respect to the first polarization direction to be polarized in the second polarization direction. In the fourth stage, the signal of the second polarization direction, which passes through the first rear phase difference film 5311b and arrives at the first rear linear polarizer 5311a, may be polarized in the first polarization direction and the signal may be attenuated.

Referring to FIG. 5B, in the electronic device 500, the sensor module 504, the display 530, and the front plate 540 may be arranged from the second surface (e.g., the rear surface) to the first surface (e.g., the front surface).

A second rear line polarizer 5312a and a second rear phase difference film 5312b may be laminated between a front surface of the sensor module 504 and a rear surface of the display 530. The second rear linear polarizer 5312a laminated on the front surface of the sensor module 504 may polarize the vibration direction of a passed signal (or light) in the first polarization direction (e.g., the direction parallel to the X-axis of the space coordinate system). A direction in which a phase difference of the second rear phase difference film 5312b laminated on a front surface of the second rear linear polarizer 5312a occurs may differ by an angle of 45 degrees from a vibration surface corresponding to the vibration direction of the passed signal (or light). Further, the second rear phase difference film 5312b may generate a phase difference of approximately λ/4 in the passed signal.

A second front phase difference film 5332a and a second front linear polarizer 5332b may be laminated between a front surface of the display 530 and a rear surface of the front plate 540. A direction in which a phase difference of the second front phase difference film 5332a laminated on the front surface of the display 530 occurs may differ by an angle of −45 degrees from the vibration surface corresponding to the vibration direction of the passed signal. Further, the second front phase difference film 5332a may generate a phase difference of approximately λ/4 in the passed signal. The second front linear polarizer 5332b laminated on a front surface of the second front phase difference film 5332a may polarize the vibration direction of the passed signal in the first polarization direction (e.g., the direction parallel to the X-axis of the space coordinate system).

An adhesive member 515 is disposed between the sensor module 504 and the second rear linear polarizer 5312a, the second rear phase difference film 5312b and the display 530, and the second front linear polarizer 5332b and the front plate 540. The adhesive member 515 may have a refractive index of 1.4 to 1.6 with respect to a signal passing through at least one of the second rear linear polarizer 5312a, the second rear phase difference film 5312b, the second front phase difference film 5332a, and the second front linear polarizer 5332b.

For a signal proceeding along a third path D3, a signal output from the optical transmitter 504a may arrive at the optical receiver 504b through first to eighth stages. In the first stage, the signal output from the optical transmitter 504a may pass through the second rear linear polarizer 5312a to be polarized in the first polarization direction (e.g., the direction parallel to the X-axis of the space coordinate system). In the second stage, the signal of the first polarization direction, which passes through the second rear linear polarizer 5312a and then passes through the second rear phase difference film 5312b, may have a phase difference of approximately λ/4, which occurs in the direction of 45 degrees with respect to the first polarization direction, and may rotate in the first rotation direction (e.g., the clockwise direction). In the third stage, the signal of the first rotation direction, which transmits the display 530 and then passes through the second front phase difference film 5332a, may have a phase difference of approximately λ/4, which further occurs in the direction of −45 degrees with respect to the first polarization direction to be polarized in the first polarization direction. In the fourth stage, the signal of the first polarization direction, which passes through the second front phase difference film 5332a, may pass through the second front linear polarizer 5332b having a polarization characteristic of the first polarization direction without loss of signal.

In the fifth stage, the signal of the first polarization direction, which passes through the second front linear polarizer 5332b and is then reflected from the subject positioned in front of the sensor module 504, may pass through the second front linear polarizer 5332b without loss of the signal. In the sixth stage, the signal of the first polarization direction, which passes through the second front linear polarizer 5332b and then passes through the second front phase difference film 5332a, may have a phase difference of approximately λ/4, which occurs in the direction of −45 degrees with respect to the first polarization direction, and may rotate in a second rotation direction (e.g., a counterclockwise direction). In the seventh stage, the signal of the second rotation direction, which transmits the display 530 and then passes through the second rear phase difference film 5312b, may have a phase difference of approximately λ/4, which further occurs in the direction of 45 degrees with respect to the first polarization direction to be polarized in the first polarization direction. In the eighth stage, the signal of the first polarization direction, which passes through the second rear phase difference film 5312b, may pass through the second rear linear polarizer 5312a, without loss of the signal at the optical receiver 504b.

For a signal proceeding along a fourth path D4, a signal output from the optical transmitter 504a may be attenuated by the second rear linear polarizer 5312a through first to fourth stages. In the first stage, the signal output from the optical transmitter 504a may pass through the second rear linear polarizer 5312a to be polarized in the first polarization direction (e.g., the direction parallel to the X-axis of the space coordinate system). In the second stage, the signal of the first polarization direction, which passes through the second rear linear polarizer 5312a and then passes through the second rear phase difference film 5312b, may have a phase difference of approximately λ/4, which occurs in the direction of 45 degrees with respect to the first polarization direction, and may rotate in the first rotation direction (e.g., the clockwise direction). In the third stage, the signal of the first rotation direction, which passes through the second rear phase difference film 5312b and is then reflected from the display 530 to pass through the second rear phase difference film 5312b, may have a phase difference of approximately λ/4, which further occurs in the direction of 45 degrees with respect to the first polarization direction to be polarized in the second polarization direction. In the fourth stage, the signal of the second polarization direction, which passes through the second rear phase difference film 5312b and then arrives at the second rear linear polarizer 5312a, may be polarized in the first polarization direction and the signal may be attenuated.

Figure 6A:
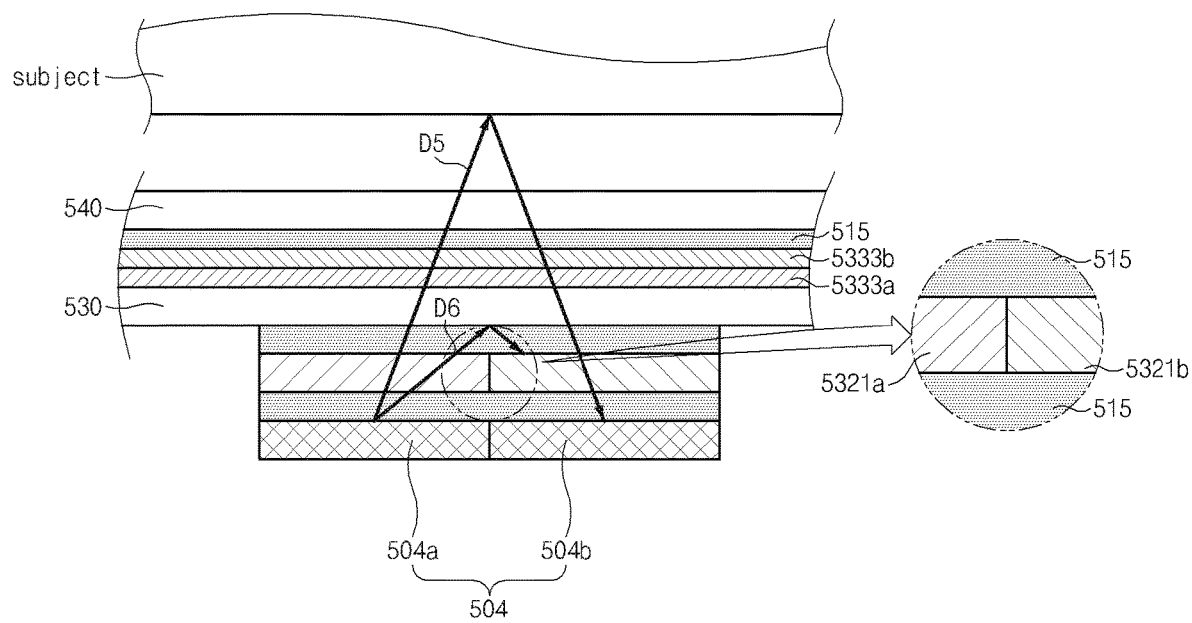
FIGS. 6A and 6B illustrate cross-sectional views taken along line A-A' of FIG. 4 according to an embodiment.
Figure 6B:
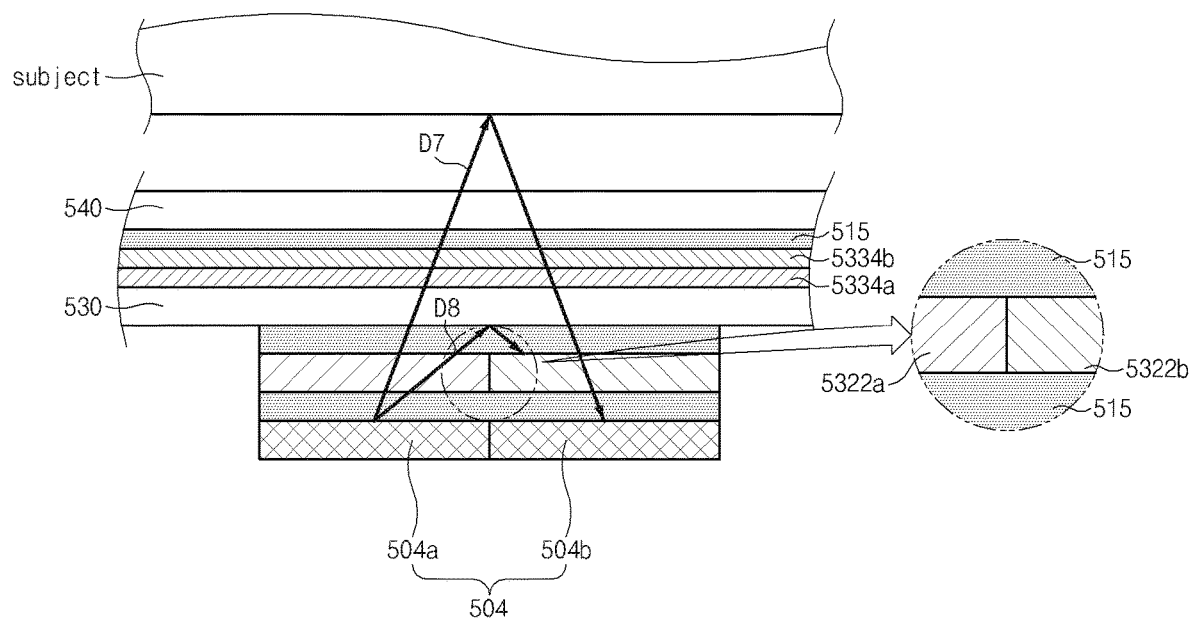

FIGS. 6A and 6B illustrate cross-sectional views taken along line A-A' of FIG. 4, according to an embodiment.

Referring to FIG. 6A, in the electronic device 500, a sensor module 504, a display 530, and a front plate 540 may be arranged from a second surface (e.g., a rear surface) to a first surface (e.g., a front surface).

A first left linear polarizer 5321a is disposed between a front surface of an optical transmitter 504a of the sensor module 504 and a rear surface of the display 530. The first left linear polarizer 5321a may polarize the vibration direction of a passed signal (or light) in a first polarization direction (e.g., a direction parallel to an X-axis of a space coordinate system). A first right linear polarizer 5321b is disposed between a front surface of an optical receiver 504b of the sensor module 504 and a rear surface of the display 530. The first right linear polarizer 5321b may polarize the vibration direction of the passed signal in a second polarization direction (e.g., a direction parallel to a Y-axis of the space coordinate system).

A third front phase difference film 5333a and a third front linear polarizer 5333b may be laminated between a front surface of the display 530 and a rear surface of the front plate 540. A direction in which a phase difference of the third front phase difference film 5333a laminated on the front surface of the display 530 occurs may differ by an angle of 45 degrees from a vibration surface corresponding to the vibration direction of the passed signal. Further, the third front phase difference film 5333a may generate a phase difference of approximately λ/4 in the passed signal. The third front linear polarizer 5333b laminated on a front surface of the third front phase difference film 5333a may polarize the vibration direction of the passed signal in the second polarization direction.

An adhesive member 515 is disposed between the sensor module 504 and the first left linear polarizer 5321a and the first right linear polarizer 5321b, the first left linear polarizer 5321a and the first right linear polarizer 5321b and the display 530, and the third front linear polarizer 5333b and the front plate 540. The adhesive member 515 may have a refractive index of 1.4 to 1.6 with respect to a signal passing through at least one of the first left linear polarizer 5321a, the first right linear polarizer 5321b, the third front phase difference film 5333a, and the third front linear polarizer 5333b.

For a signal proceeding along a fifth path D5, a signal output from the optical transmitter 504a may arrive at the optical receiver 504b through first to sixth stages. In the first stage, the signal output from the optical transmitter 504a may pass through the first left linear polarizer 5321a to be polarized in the first polarization direction. In the second stage, the signal of the first polarization direction, which transmits the display 530 and then passes through the third front phase difference film 5333a, may have a phase difference of approximately λ/4, which occurs in the direction of 45 degrees with respect to the first polarization direction, and may rotate in a first rotation direction (e.g., a clockwise direction). In the third stage, the signal of the first rotation direction, which passes through the third front phase difference film 5333a and then pass through the third front linear polarizer 5333b, may be polarized in the second polarization direction. In the fourth stage, the signal of the second polarization direction, which passes through the third front linear polarizer 5333b and is then reflected from a subject positioned in front of the sensor module 504, may pass through the third front linear polarizer 5333b without loss of the signal. In the fifth stage, the signal of the second polarization direction, which passes through the third front linear polarizer 5333b and then passes through the first front phase difference film 5333a, may have a phase difference of approximately λ/4, which occurs in the direction of 45 degrees with respect to the second polarization direction, and may rotate in the first rotation direction. In the sixth stage, the signal of the first rotation direction, which transmits the display 530 and then passes through the first right linear polarizer 5321b, may be polarized in the second polarization direction to arrive at the optical receiver 504b.

For a signal proceeding along a sixth path D6, a signal output from the optical transmitter 504a may be attenuated by the first right linear polarizer 5321b through first and second stages. In the first stage, the signal output from the optical transmitter 504a may pass through the first left linear polarizer 5321a to be polarized in the first polarization direction. In the second stage, the signal of the first polarization direction, which passes through the first left linear polarizer 5321a and is then reflected from the display 530 to arrive at the first right linear polarizer 5321b, may be polarized in the second polarization direction and the signal may be attenuated.

Referring to FIG. 6B, in the electronic device 500, the sensor module 504, the display 530, and the front plate 540 may be arranged from the second surface (e.g., the rear surface) to the first surface (e.g., the front surface).

A second left linear polarizer 5322a is disposed between a front surface of the optical transmitter 504a of the sensor module 504 and a rear surface of the display 530. The second left linear polarizer 5322a may polarize the vibration direction of a passed signal in the first polarization direction. A second right linear polarizer 5322b is disposed between a front surface of the optical receiver 504b of the sensor module 504 and the rear surface of the display 530. The second right linear polarizer 5322b may polarize the vibration direction of the passed signal in the second polarization direction.

A fourth front phase difference film 5334a and a fourth front linear polarizer 5334b may be laminated between a front surface of the display 530 and a rear surface of the front plate 540. A direction in which a phase difference of the fourth front phase difference film 5334a laminated on the front surface of the display 530 may differ by an angle of −45 degrees from a vibration surface corresponding to the vibration direction of the passed signal. Further, the fourth front phase difference film 5334a may generate a phase difference of approximately λ/4 in the passed signal. The fourth front linear polarizer 5334b laminated on a front surface of the fourth front phase difference film 5334a may polarize the vibration direction of the passed signal in the second polarization direction.

An adhesive member 515 is disposed between the sensor module 504 and the second left linear polarizer 5322a and the second right linear polarizer 5322b, the second left linear polarizer 5322a and the second right linear polarizer 5322b and the display 530, and the fourth front linear polarizer 5334b and the front plate 540. The adhesive member 515 may have a refractive index of 1.4 to 1.6 with respect to a signal passing through at least one of the second left linear polarizer 5322a, the second right linear polarizer 5322b, the fourth front phase difference film 5334a, and the fourth front linear polarizer 5334b.

For a signal proceeding along a seventh path D7, a signal output from the optical transmitter 504a may arrive at the optical receiver 504b through first to sixth stages. In the first stage, the signal output from the optical transmitter 504a may pass through the second left linear polarizer 5322a to be polarized in the first polarization direction. In the second stage, the signal of the first polarization direction, which transmits the display 530 and then passes through the fourth front phase difference film 5334a, may have a phase difference of approximately λ/4, which occurs in the direction of −45 degrees with respect to the first polarization direction, and may rotate in a second rotation direction (e.g., a counterclockwise direction). In the third stage, the signal of the second rotation direction, which passes through the fourth front phase difference film 5334a and then pass through the fourth front linear polarizer 5334b, may be polarized in the second polarization direction. In the fourth stage, the signal of the second polarization direction, which passes through the fourth front linear polarizer 5334b and is then reflected from the subject positioned in front of the sensor module 504, may pass through the fourth front linear polarizer 5334b without loss of the signal. In the fifth stage, the signal of the second polarization direction, which passes through the fourth front linear polarizer 5334b and then passes through the fourth front phase difference film 5334a, may have a phase difference of approximately λ/4, which occurs in the direction of −45 degrees with respect to the second polarization direction, and may rotate in the second rotation direction. In the sixth stage, the signal of the second rotation direction, which transmits the display 530 and then passes through the second right linear polarizer 5322b, may be polarized in the second polarization direction to arrive at the optical receiver 504b.

For a signal proceeding along an eighth path D8, a signal output from the optical transmitter 504a may be attenuated by the second right linear polarizer 5322b through first and second stages. In the first stage, the signal output from the optical transmitter 504a may pass through the second left linear polarizer 5322a to be polarized in the first polarization direction. In the second stage, the signal of the first polarization direction, which passes through the second left linear polarizer 5322a and is then reflected from the display 530 to arrive at the second right linear polarizer 5322b, may be polarized in the second polarization direction and the signal may be attenuated.

Figure 7:
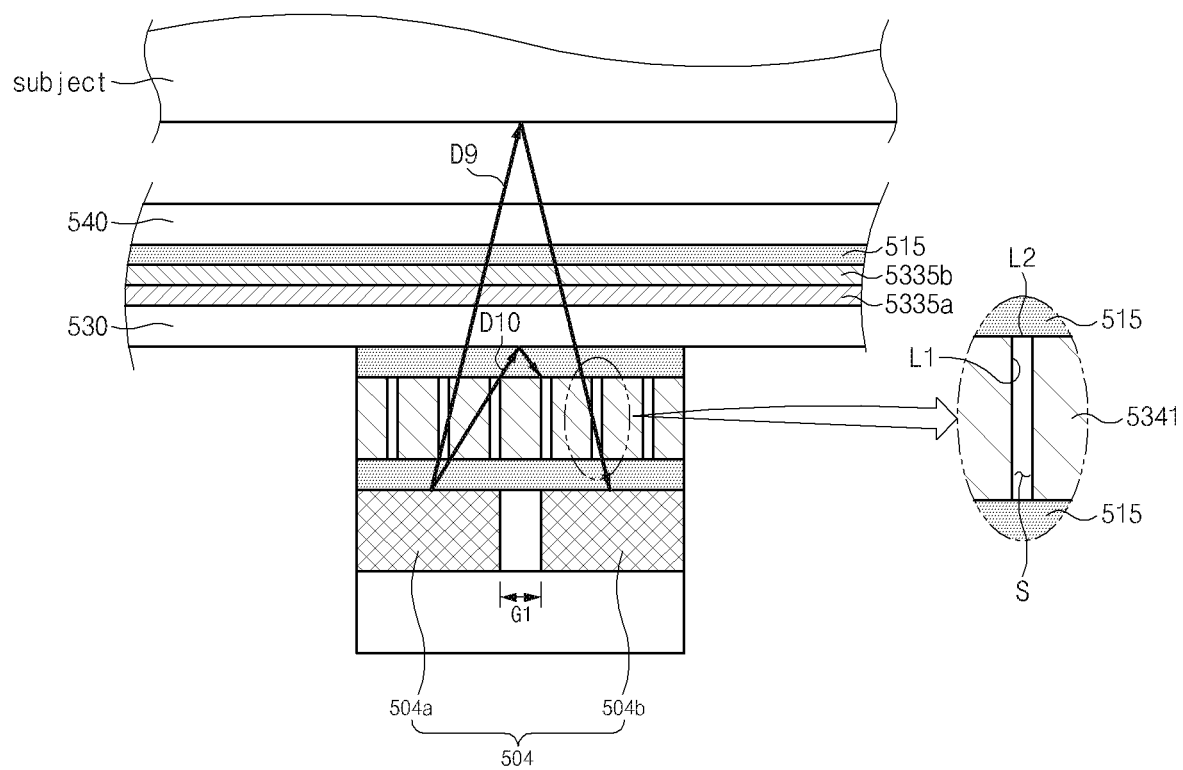
FIG. 7 illustrates a cross-sectional view taken along line A-A' of FIG. 4 according to an embodiment.

FIG. 7 illustrates a cross-sectional view taken along line A-A' of FIG. 4 according to an embodiment.

Referring to FIG. 7, in the electronic device 500, a sensor module 504, a display 530, and a front plate 540 may be arranged from a second surface (e.g., a rear surface) to a first surface (e.g., a front surface).

A collimator 5341 is disposed between the sensor module 504 and a rear surface of the display 530. A plurality of transmission regions S may be formed in the collimator 5341, in a direction perpendicular to the rear surface of the display 530. Each transmission region S may include a first length L1 of the direction perpendicular to the rear surface of the display 530 and a second length L2 of a direction parallel to the surface of the display 530. The first length L1 and the second length L2 may include a certain length depending on a set ratio (e.g., 1:1). Alternatively, an angle at which a signal passes through the transmission region S may be determined according to a set ratio of the first length L1 to the second length L2. For example, the collimator 5341 may pass only a signal facing the display 530 at a set angle among the signals passing through the transmission region S.

A fifth front phase difference film 5335a and a fifth front linear polarizer 5335b may be laminated between a front surface of the display 530 and a rear surface of the front plate 540.

An adhesive member 515 is disposed between the sensor module 504 and the collimator 5341, the collimator 5341 and the display 530, and the fifth front linear polarizer 5335b and the front plate 540.

For a signal proceeding along a ninth path D9, a signal output from an optical transmitter 504a may arrive at an optical receiver 504b through first to third stages. In the first stage, a partial signal, which has a direction in which the first length L1 points and an angle of a set angle (e.g., 45 degrees) or less, of the signal output from an optical transmitter 504a, may pass through the transmission region S disposed in a front surface of the optical transmitter 504a. In the first stage, the transmission region S disposed in the front surface of the optical transmitter 504a may include the first length L1 and the second length L2, which have the set ratio (e.g., 1:1). In the second stage, the signal passing through the transmission region S, the display 530, and the front plate 540 may be reflected from a subject positioned in front of the sensor module 504. In the second stage, an interval between the optical transmitter 504a and the subject may be the same as a set interval (e.g., 1 mm) between the optical transmitter 504a and the optical receiver 504b or may be wider than the set interval G between the optical transmitter 504a and the optical receiver 504b. In the third stage, the signal reflected from the subject may transmit through the front plate 540 and the display 530 and may then pass through the transmission region S disposed in the front surface of the optical receiver 504b to arrive at the optical receiver 504b. In the third stage, only a signal, which has the direction in which the first length L1 points and the angle of the set angle (e.g., 45 degrees) or less, among signals passing through the front plate 540 and the display 530, may arrive at the optical receiver 504b.

For a signal proceeding along a tenth path D10, a signal output from an optical transmitter 504a may be blocked by the collimator 5341 through first and second stages. In the first stage, a partial signal, which has the direction in which the first length L1 points and the angle of the set angle (e.g., 45 degrees) or less, of the signal output from the optical transmitter 504a, may pass through the transmission region S disposed in the front surface of the optical transmitter 504a. In the first stage, the transmission region S disposed in the front surface of the optical transmitter 504a may include the first length L1 and the second length L2, which have the set ratio. In the second stage, because a signal, which passes through the transmission region S disposed in the front surface of the optical transmitter 504a and is then reflected from the display 530 (or any one of the adhesive member 515, the fifth front phase difference film 5335a, the fifth front linear polarizer 5335b, and the front plate 540) to arrive at the collimator 5341, exceeds the direction in which the first length L1 points and the set angle (e.g., 45 degrees) due to, for example, the ratio of an interval between the collimator 5341 and the display 530 to the set interval G between the optical transmitter 504a and the optical receiver 504b, it may fail to pass through the transmission region S disposed in the front surface of the optical receiver 504b.

As described above, an electronic device according to an embodiment may include a sensor module, a display configured to include a first surface and a second surface in opposite directions, the second surface being combined with the sensor module, a rear linear polarizer disposed in a front surface of the sensor module, a rear phase difference film disposed between a front surface of the rear linear polarizer and the second surface, a front phase difference film disposed in the first surface to correspond to a location of the sensor module, a front linear polarizer disposed in a front surface of the front phase difference film, and a front plate disposed in a front surface of the front linear polarizer.

The rear linear polarizer may polarize a vibration direction of a signal passing through the rear linear polarizer in a first polarization direction.

A direction where a phase difference of the rear phase difference film occurs may have a difference with a vibration surface corresponding to a vibration direction of a signal passing through the rear linear polarizer by an angle of 45 degrees.

The rear phase difference film may generate a phase difference of about $\lambda/4$ in a signal passing through the rear phase difference film.

A direction where a phase difference of the front phase difference film occurs may have a difference with a vibration surface corresponding to a vibration direction of a signal passing through the rear phase difference film by an angle of 45 degrees.

The front phase difference film may generate a phase difference of about $\lambda/4$ in a signal passing through the front phase difference film.

The front linear polarizer may polarize a vibration direction of a signal passing through the front linear polarizer in a second polarization direction.

The front linear polarizer may polarize a vibration direction of a signal passing through the front linear polarizer in a first polarization direction.

The electronic device may further include an adhesive member configured to adhere at least two of the components of the electronic device.

The adhesive member may have a refractive index of 1.4 to 1.6.

As described above, an electronic device according to an embodiment may include a sensor module configured to include an optical transmitter and an optical receiver, a display configured to include a first surface and a second surface in opposite directions, the second surface being combined with the sensor module, a left linear polarizer disposed between a front surface of the optical transmitter of the sensor module and the second surface, a right linear polarizer disposed between a front surface of the optical receiver of the sensor module and the second surface, a front phase difference film disposed in the first surface to correspond to a location of the sensor module, a front linear polarizer disposed in a front surface of the front phase difference film, and a front plate disposed in a front surface of the front linear polarizer.

The left linear polarizer may polarize a vibration direction of a signal passing through the left linear polarizer in a first polarization direction.

The right linear polarizer may polarize a vibration direction of a signal passing through the right linear polarizer in a second polarization direction.

A direction where a phase difference of the front phase difference film occurs may have a difference with a vibration surface corresponding to a vibration direction of a signal passing through the left linear polarizer by an angle of 45 degrees.

The front linear polarizer may polarize a vibration direction of a signal passing through the front linear polarizer in a second polarization direction.

As described above, an electronic device according to an embodiment may include a sensor module, a display configured to include a first surface and a second surface in opposite directions, the second surface being combined with the sensor module, and a collimator disposed between the sensor module and the second surface.

The collimator may include a plurality of transmission regions facing a direction perpendicular to the display.

Each of the plurality of transmission regions may include a first length of a direction perpendicular to a rear surface of the display and a second length of a direction parallel to the rear surface of the display.

An angle where a signal passes through each of the plurality of transmission regions may be determined according to a set ratio of the first length to the second length.

An interval between the collimator and the display may be smaller than an interval between an optical transmitter and an optical receiver included in the sensor module.

Figure 8:
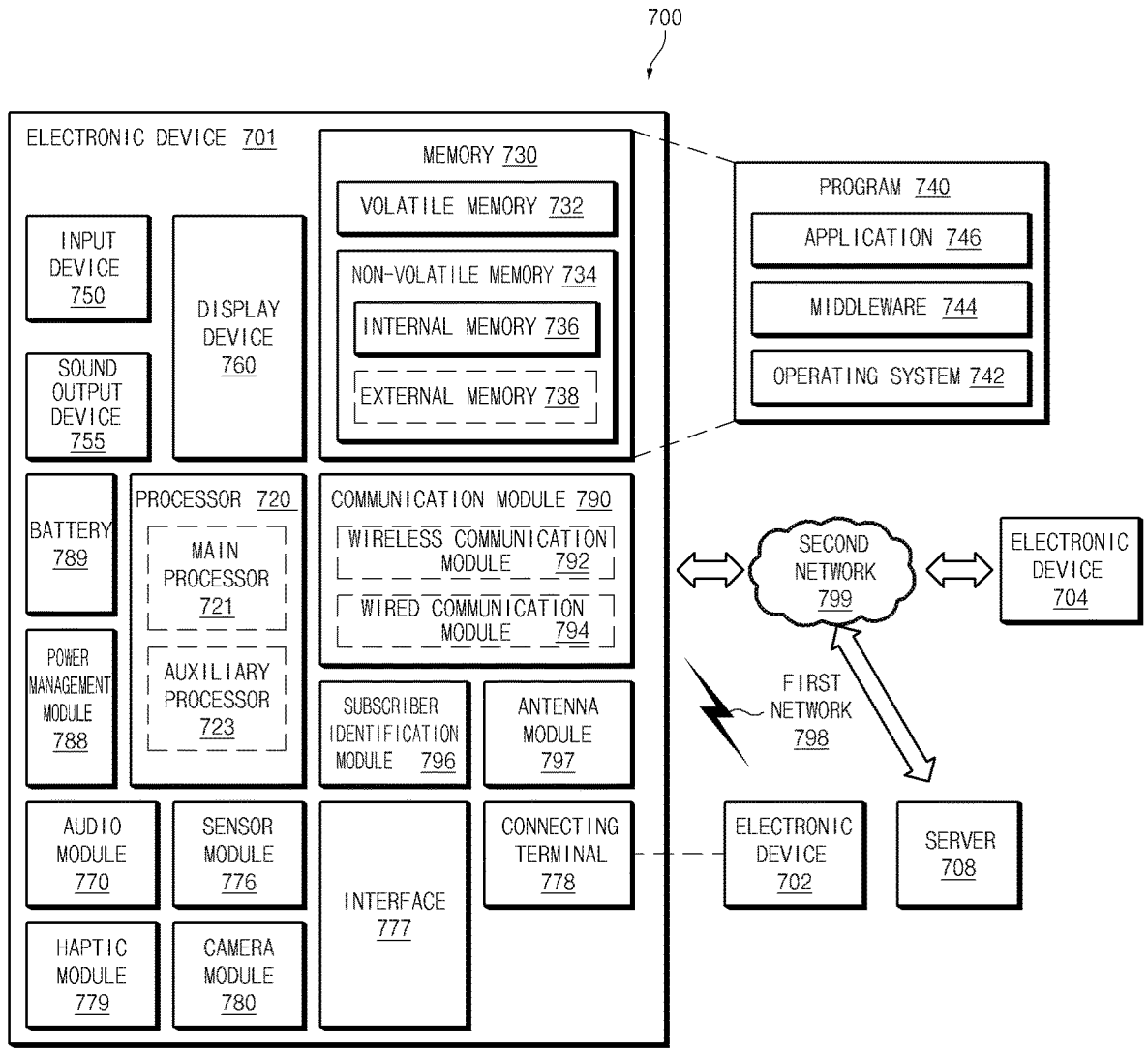
FIG. 8 illustrates an electronic device in a network environment according to an embodiment.

FIG. 8 illustrates an electronic device in a network environment according to an embodiment.

Referring to FIG. 8, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a CPU or an AP), and an auxiliary processor 723 (e.g., a GPU, an ISP, a sensor hub processor, or a CP) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an ISP or a CP) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an IR sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, an HDMI, a USB interface, an SD card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, ISPs, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more CPs that are operable independently from the processor 720 (e.g., the AP) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

A method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, although a signal of the sensor disposed in the screen display region of the display is reflected from the display, the electronic device may attenuate the reflected signal, thus improving a signal-to-noise ratio (SNR).

According to embodiments disclosed in the disclosure, the electronic device may increase transmissivity of a signal which is output from the sensor disposed in the screen display region of the display, then transmits the display, and then return to the sensor.

In addition, various effects directly or indirectly ascertained through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
 a front plate;
 a sensor including an optical transmitter and an optical receiver;
 a display disposed between the front plate and the sensor;
 a collimator disposed between the display and the sensor;
 a front phase difference film disposed between the front plate and the display; and
 a front linear polarizer disposed between the front plate and the front phase difference film,
 wherein an interval between the collimator and the display is smaller than an interval between the optical transmitter and the optical receiver of the sensor.

2. The electronic device of claim 1, wherein the front phase difference film generates a phase difference of approximately λ/4 in a signal passing through the front phase difference film.

3. The electronic device of claim 1, wherein the front linear polarizer polarizes a vibration direction of a signal passing through the front linear polarizer in a second polarization direction.

4. The electronic device of claim 1, wherein the front linear polarizer polarizes a vibration direction of a signal passing through the front linear polarizer in a first polarization direction.

5. The electronic device of claim 1, further comprising at least one of a first adhesive member and a second adhesive member,
 wherein the first adhesive member is disposed between the display and the collimator, and
 wherein the second adhesive member is disposed between the collimator and the sensor.

6. The electronic device of claim 5, wherein the at least one of the first adhesive member and the second adhesive member has a refractive index of 1.4 to 1.6.

7. An electronic device, comprising:
 a sensor;
 a display including a first surface and a second surface; and
 a collimator disposed between the sensor and the second surface of the display,
 wherein an interval between the collimator and the display is smaller than an interval between an optical transmitter and an optical receiver included in the sensor.

8. The electronic device of claim 7, wherein the collimator includes a plurality of transmission regions facing a direction perpendicular to the display.

9. The electronic device of claim 8, wherein each of the plurality of transmission regions includes a first length of a first direction perpendicular to a rear surface of the display and a second length of a second direction parallel to the rear surface of the display.

10. The electronic device of claim 9, wherein an angle at which a signal passes through each of the plurality of transmission regions is determined according to a set ratio of the first length to the second length.

* * * * *